June 23, 1959
E. SAUER ET AL
2,891,454
SINGLE LENS MIRROR REFLEX CAMERAS
Filed Feb. 23, 1955
3 Sheets-Sheet 1
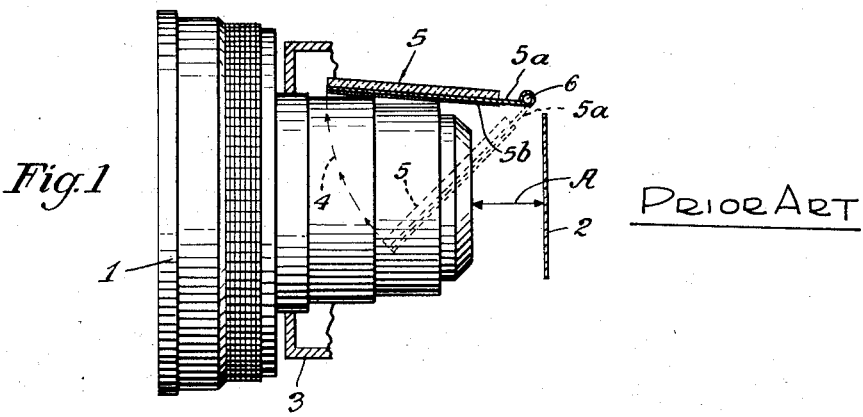
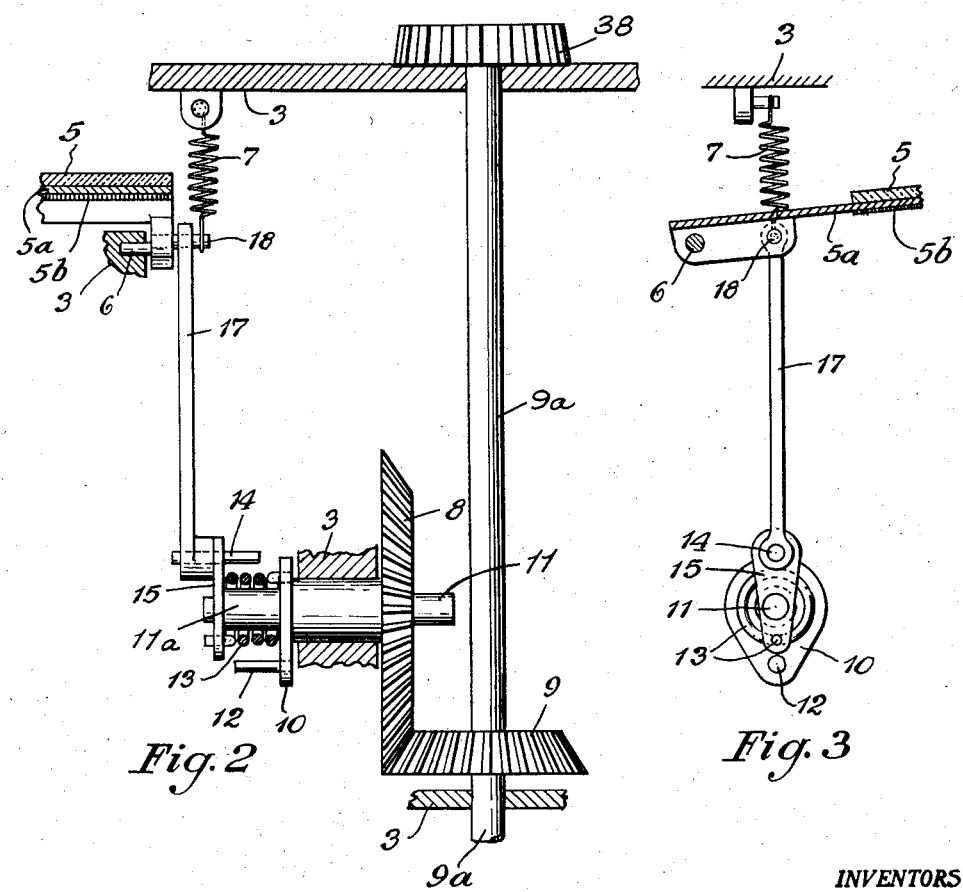
INVENTORS:
Edgar Sauer
Werner Zink
by Singer, Stern & Carlberg,
Attorneys.

United States Patent Office

2,891,454
Patented June 23, 1959

2,891,454

SINGLE LENS MIRROR REFLEX CAMERAS

Edgar Sauer, Stuttgart, and Werner Zink, Stuttgart-Bad Cannstatt, Germany, assignors to Zeiss Ikon A.G., Stuttgart, Stuttgart, Germany Application February 23, 1955, Serial No. 489,982

3 Claims. (Cl. 95—42)

The invention relates to a single lens mirror reflex camera which is adapted to be equipped with a wide angle lens system. It is known that wide angle lens systems have a relatively small focal length. The employment of such wide angle lens systems in single lens mirror reflex cameras is, therefore, difficult or not possible at all because the portion of the lens system facing the film or the light sensitive layer which is to be exposed through the lens, will extend into the range of the reflecting mirror which during the operation of the shutter tensioning mechanism, or when the film conveying mechanism is actuated, is moved from the exposure position into the finder position. Sometimes the mirror returns automatically into the finder position upon the release of the shutter, for instance, by means of a suitable gear connection which is operated after the shutter has run off—or, in other words, after the film has been exposed.

The various objects and novel features of the invention are explained in the following description with reference to the accompanying drawings, in which—

Fig. 1 illustrates diagrammatically a conventional arrangement of a wide angle lens system with reference to a movable finder mirror and a film in a single lens mirror reflex camera.

Fig. 2 illustrates in front elevation a yieldable mechanism in accordance with the present invention for operating the reflex mirror in a single lens mirror reflex camera.

Fig. 3 illustrates a side elevation view of the mechanism shown in Fig. 2.

Figure 4:
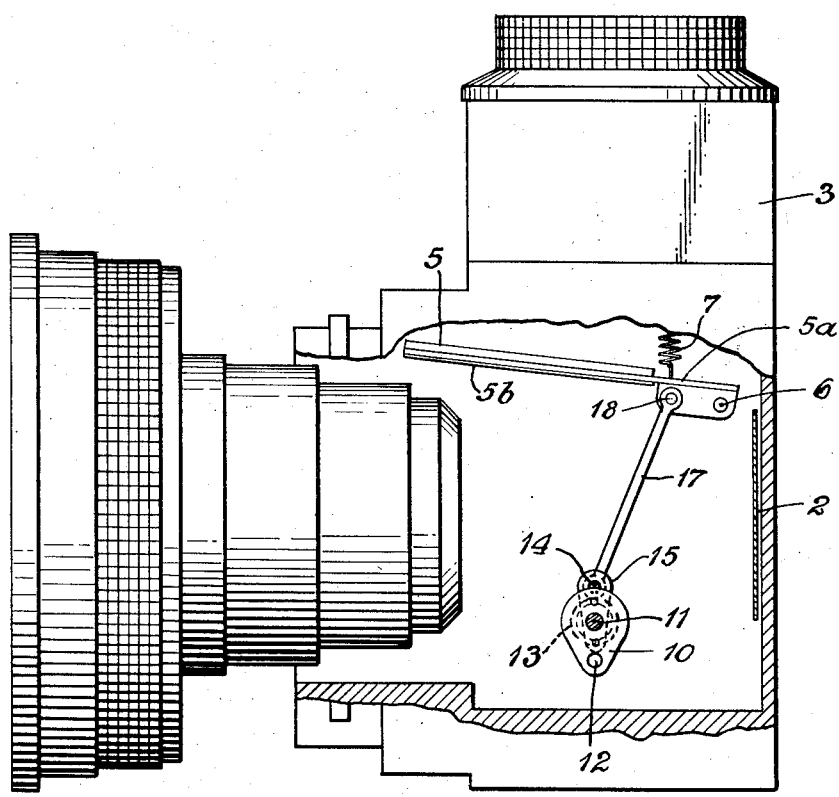
Fig. 4 illustrates in side elevation view a single lens mirror reflex camera in which the mechanism of Figs. 2 and 3 is incorporated.

Fig. 1 illustrates the position of a wide angle lens system 1 in a conventional camera casing 3 with reference to the film 2 therein, and one can appreciate that owing to the small focal length, which is indicated by the line A, the mirror 5 would have to move into the space occupied by the lens system 1 during its change from the finder position, which is illustrated in dotted lines, to the horizontal position, which is indicated in solid line, in which latter position the film 2 can be exposed by light passing through the lens system.

It will be noted that the outer edge of the mirror 5 would have to move along the curved path 4, indicated in dotted lines. It is obvious that under this condition the mirror 5 could not at all operate when the mentioned wide angle lens system 1 is inserted into the camera casing 3, at least the conventional mechanism for controlling the movement of the mirror 5 could not be employed.

It is now an object of the present invention to adapt a wide angle lens system for use in single lens mirror reflex cameras so that a camera of the last mentioned type will become more versatile in its use. For this purpose, the mirror or its carrier, respectively, with the associated control mechanism, such as a gearing, which tensions the shutter and effects a movement of the film, is operatively arranged in the camera in such a manner that the mirror, or its carrier, independently of the actuation or the position of the control mechanism may be positioned in its inoperative position in order to permit the attachment of a wide angle lens system, or other parts, to and within the camera casing.

By way of example, there is provided, according to the invention, between the mirror and the gearing, for adjusting the same, a spring which may be tensioned to a degree which is equivalent to the entire path of movement of the mirror from its inoperative to its finder or operative position. When this is done, it is possible to insert into the camera casing a wide angle lens system when the shutter is released and the mirror is arranged in its inoperative position. When now the shutter is tensioned, the mirror remains in its inoperative position in which the photographic film may be exposed, and engages the outer circumference of the mount of the lens system with spring pressure, as shown in solid lines in Fig. 1.

The Figs. 2 and 3 disclose by way of example a spring arrangement which may be employed. The mirror 5 is attached to a carrier plate 5a which is rotatable about a horizontal axis 6 and a tension spring 7 attached with one end to the top wall of the camera casing 3 and with its other end to a pin 18 on the carrier 5a is adapted to move the mirror 5 pivotally into its inoperative position in which the lens system 1 is able to expose the film 2 in the rear of the lens system when the shutter is opened.

A winding knob 38 accessible from the exterior of the camera casing 3 actuates a shaft 9a carrying a bevel gear 9 meshing with a bevel gear 8 on a short shaft 11 on which a crank member 10 is attached. In axial alignment with the shaft 11 is arranged a second crank member 15, and the two cranks 15 and 10 are connected with each other by means of a torsion spring 13 which spring surrounds a shaft extension 11a and is able to effect a rotation of the crank 15 when the crank 10 is rotated. The ends of the torsion spring 13 are inserted in apertures provided in the plate-like crank members 10 and 15. The crank pins 12 and 14 on these crank members 10 and 15, respectively, are normally in engagement with each other and maintain the spring 13 under a predetermined tension, forming in effect a rigid connection between the crank members in one direction of rotation. The pin 14 of the crank member 15 is also connected by means of a link 17 with to the pin 18 on the carrier 5a of the mirror 5. Figure 3 shows that the pin 18 is spaced from the axis of rotation 6 of the mirror 5. When the crank member 10, in the just described position of the pins 12 and 14, during the tensioning of the shutter is rotated clockwise, as by manually rotating the knob 38 (Figure 2), the mirror 5 is moved downwardly into its operative or the finder position, provided the space within the camera casing and in front of the film 2 is vacant. Of course, the pretensioning of the torsion spring 13 is stronger than the tension of the tension spring 7. If, however, a lens system extends into the path of movement of the mirror, the latter is unable to move into the finder position when the shutter is tensioned, but in that case the mirror 5 during its downward movement will engage the outer circumference of the mount of the lens system, while the torsion spring 13 will be put under increased tension corresponding to the entire path of movement which the mirror would perform if the lens system would not interrupt the movement of the mirror. When this happens, the pin 12 moves about the axis of the shaft away from the pin 14. This position is illustrated in Figs. 2 and 3.

In order to protect the rear face of the mirror carrier 5a and the outer surface of the lens mount which is engaged by the mirror carrier 5a, it is advisable to provide the rear wall of the mirror carrier with a soft layer 5b of material—for instance, velvet, or the like.

In this described embodiment, it is possible to insert a wide angle lens system into a single reflex lens camera, provided the shutter has been released, in which position the mirror is pivoted upwardly so that the camera is in a position for exposure.

Figure 5:
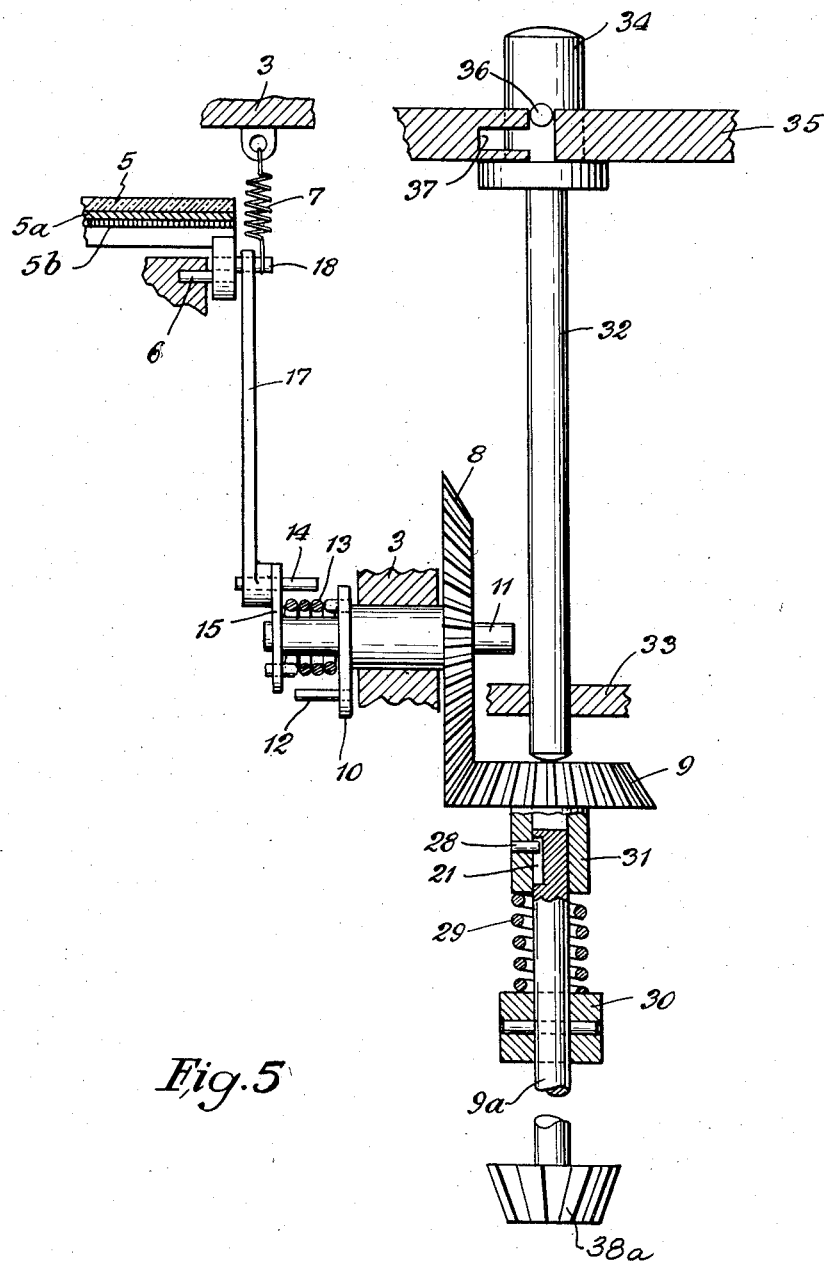
Fig. 5 illustrates diagrammatically a safety device of the present invention.

When the camera is constructed in the just described manner, then one frame of the film of the size of a complete exposure will get lost when only after the tensioning of the shutter the wide angle lens system is inserted into the camera casing. Therefore, one has to release the shutter once in order to move the mirror from the finder position into its inoperative position so that the lens system may be inserted in the camera casing. This loss of a picture frame may be avoided by another novel feature of the invention, according to which the operative connection between the mirror and its operating mechanism is made releasable by providing a manusually operable device—for instance, a push button, during the actuation of which the mirror is moved into its inoperative position. This novel feature may be incorporated in this manner that the bevel gears 8 and 9 are brought out of engagement with each other so that the mirror 5 under the action of the spring 7 is pivotally moved upwardly so that the camera will be in the exposure position. According to Fig. 5, the shaft 9a which is rotatable by the knob 38a and carries the bevel gear 9 has secured thereon a ring 30 which is engaged by one end of a spring 29 which surrounds the shaft 9a and engages with its other end a sleeve 31, pushing the bevel gear 9 in engagement with the bevel gear 8. The sleeve 31 is fixed to the bevel gear 9 and assures a safe guiding of the latter and provides sufficient free play for an axial displacement of the bevel gear 9. The driving connection between the shaft 9a and the sleeve 31 consists of a pin 28 extending from the sleeve 31 into an axial slot 21 of the shaft 9a. For the purpose of disengaging the bevel gear 9 from the bevel gear 8, there is provided a rod 32 in axial alignment with the shaft 9a and guided at 33 in a portion of the camera casing 3. One end of the rod 32 terminates in a push button 34 which is accessible from the outside of the camera casing and, for instance, extends through the camera top wall 35.

The conditions in the tensioning and run off mechanisms of the camera may be such that when the shutter is released, the bevel gear 9 rotates in a direction in which it moves the mirror into its inoperative position provided the mirror is coupled to the gear 9, in which the mirror is, however, already positioned, because the button 34 was actuated. Therefore, an additional locking device is provided consisting, for instance, of a radial pin 36 on the push button 34, and a T-shaped slot 37 in the camera wall 35. This mechanism permits, after the pressing of the button 34 and its subsequent rotation, the locking of the push button 34 in this position so that the bevel gears 8 and 9 remain out of engagement. The button 34 in such a case need not be manually depressed when the shutter is released. It is advisable to maintain the button 34 during the entire time during which the wide angle lens system is attached to the camera in the mentioned depressed and locked position. In such a case, the mirror will not be urged against the mount of the lens system when the shutter is tensioned and the torsion spring 13 is relieved. In fact, under certain conditions the torsion spring may be omitted.

When a wide angle lens system is inserted in the camera casing, the reflex finder is, of course, inoperative and, therefore, the camera cannot be used as a mirror reflex camera. It is, therefore, advisable to mount into the camera casing a special straight view finder for the wide angle lens system or to attach such a finder to the outside of the camera casing.

What we claim is:

1. In a single lens mirror reflex camera, a camera casing having means for detachably securing in the front wall of said camera casing a wide angle lens system having a mount extending with its rear end into said camera casing, a reflecting mirror forming a part of the finder of the camera mounted pivotally about a fixed axis in said camera casing and adapted to engage the rear end of said mount when said mirror moves from a position outside of the path of the light rays entering said camera casing through said lens system towards its focusing position inclined to and crossing the optical axis of said lens system, and means for moving said pivoted reflecting mirror from said outside position to its focusing position and vice versa, said means including a manually rotatable knob, a gearing within said camera casing, an operative connection between said knob and said gearing, a shaft driven by said gearing and positioned parallel to said fixed axis, a crank member with a crank pin thereon, fixed on said shaft, another crank member with a crank pin thereon rotatably mounted on said shaft, a torsion spring surrounding said shaft and arranged between said crank members with the ends of said torsion spring connected to said crank members, said crank pins normally being positioned side by side in engagement with each other, a link connecting said rotatably mounted crank member with said reflecting mirror at a point spaced from said fixed axis, and a tension spring for normally urging said reflecting mirror into said outside position, said link upon actuating said manually operatable knob moving said reflecting mirror towards its focusing position until said mirror engages the rear end of said mount in which case the movement of said link is arrested and said knob completes its operating cycle by causing a relative movement between said crank members and increasing the tension in said torsion spring.

2. In a single lens mirror reflex camera, a camera casing having means for detachably securing in the front wall of said camera casing a wide angle lens system having a mount extending with its rear end into said camera casing, a reflecting mirror forming a part of the finder of the camera mounted pivotally about a fixed axis in said camera casing and adapted to engage the rear end of said mount when said mirror moves from a position outside of the path of the light rays entering said camera casing through said lens system towards its focusing position inclined to and crossing the optical axis of said lens system, and means for moving said pivoted reflecting mirror from said outside position to its focusing position and vice versa, said means including a manually rotatable knob, a gearing within said camera casing, an operative connection between said knob and said gearing, a shaft driven by said gearing and positioned parallel to said fixed axis, a crank member with a crank pin thereon fixed on said shaft, another crank member with a crank pin thereon rotatably mounted on said shaft, a torsion spring surrounding said shaft and arranged between said crank members with the ends of said torsion spring connected to said crank members, said crank pins normally being positioned side by side in engagement with each other, a link connecting said rotatably mounted crank member with said reflecting mirror at a point spaced from said fixed axis, and a tension spring for normally urging said reflecting mirror into said outside position, said link upon actuating said manually operatable knob moving said reflecting mirror towards its focusing position until said mirror engages the rear end of said mount in which case the movement of said link is arrested and said knob completes its operating cycle by causing a relative movement between said crank members and increasing the tension in said torsion spring, and a manually releasable coupling arranged in said operative connection between said manually rotatable knob and said gearing.

3. In a single lens mirror reflex camera, a camera casing having means for detachably securing in the front wall of said camera casing a wide angle lens system having a mount extending with its rear end into said camera casing, a reflecting mirror forming a part of the finder of the camera mounted pivotally about a fixed axis in said camera casing and adapted to engage the rear end of said mount when said mirror moves from a position outside of the path of the light rays entering said camera casing through said lens system towards its focusing position inclined to and crossing the optical axis of said lens system, and means for moving said pivoted reflecting mirror from said outside position to its focusing position and vice versa, said means including a manually rotatable shutter winding knob, a gearing within said camera casing, an operative connection between said knob and said gearing, a shaft driven by said gearing and positioned parallel to said fixed axis, a crank member with a crank pin thereon, fixed on said shaft, another crank member with a crank pin thereon rotatably mounted on said shaft, a torsion spring surrounding said shaft and arranged between said crank members with the ends of said torsion spring connected to said crank members, said crank pins normally being positioned side by side in engagement with each other, a link connecting said rotatably mounted crank member with said reflecting mirror at a point spaced from said fixed axis, and a tension spring for normally urging said reflecting mirror into said outside position, said link upon actuating said manually rotatable knob in a shutter winding direction moving said reflecting mirror towards its focusing position until said mirror engages the rear end of said mount in which case the movement of said link is arrested and said knob completes its shutter winding cycle by causing a relative movement between said crank members and increasing the tension in said torsion spring.

References Cited in the file of this patent

UNITED STATES PATENTS 2,352,177   Bolsey ----------------- June 27, 1944

FOREIGN PATENTS 231,080   Switzerland ------------ May 16, 1944